Feb. 9, 1960             E. G. RUGET             2,924,400
APPARATUS FOR ENABLING THE MANOEUVRABILITY AND
THE STABILITY OF A SUPERSONIC
AIRCRAFT TO BE CONTROLLED
Filed May 18, 1954                                3 Sheets-Sheet 1
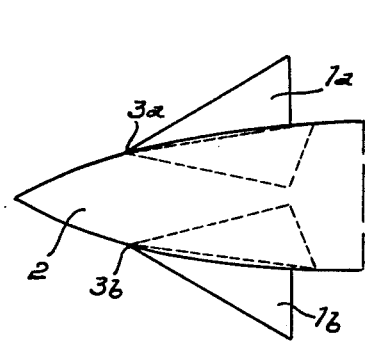
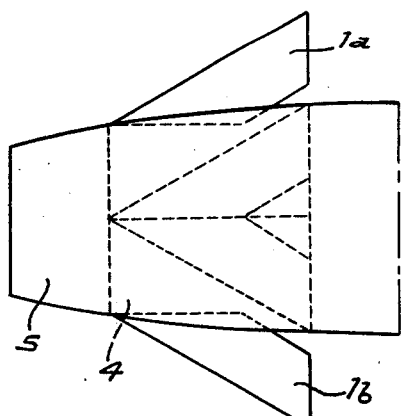
Fig.1.          Fig.2.
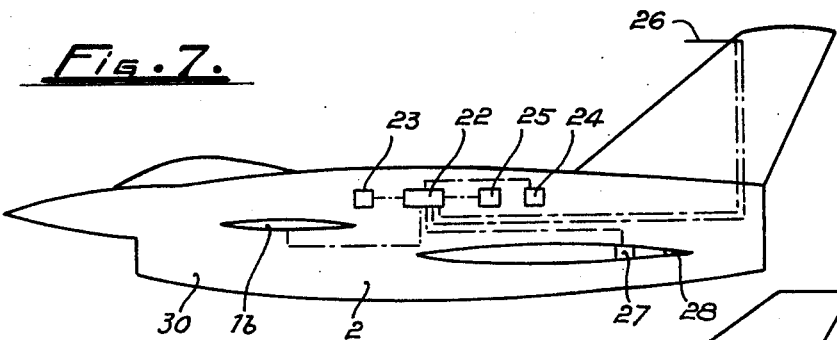
Fig.7.
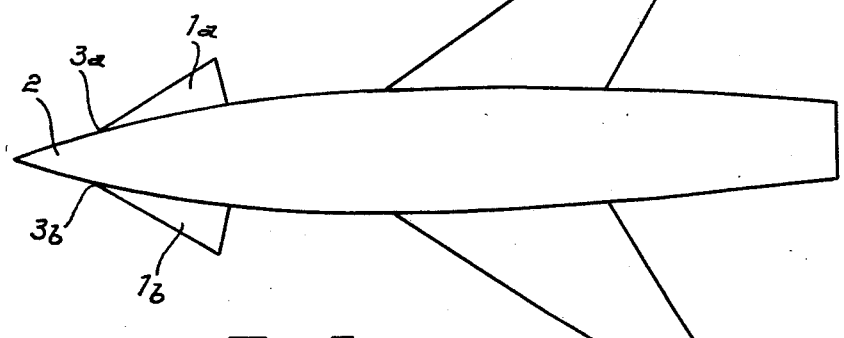
Fig.3.
Inventor
Etienne, Germain Ruget
By Karl W. Flocks
Attorney

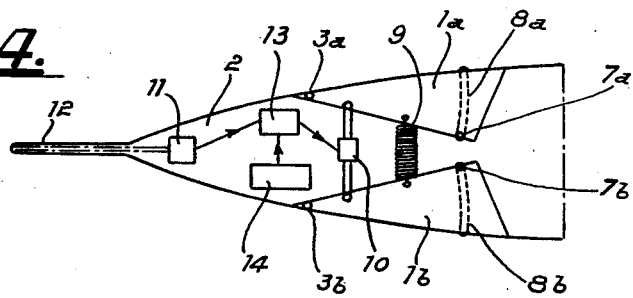
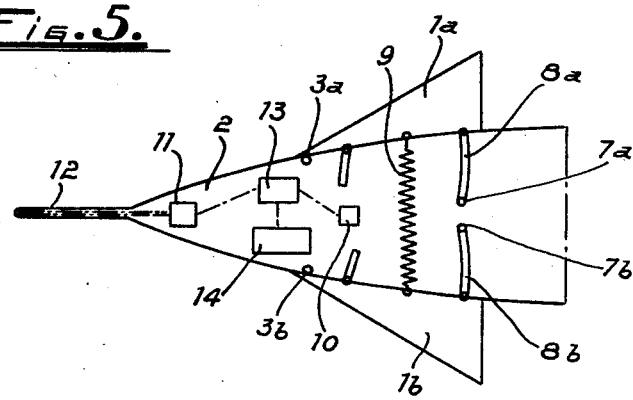
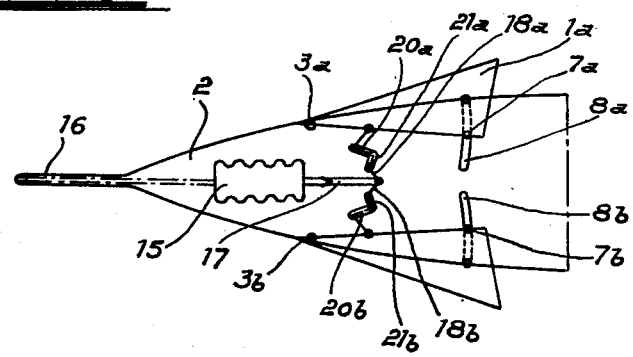

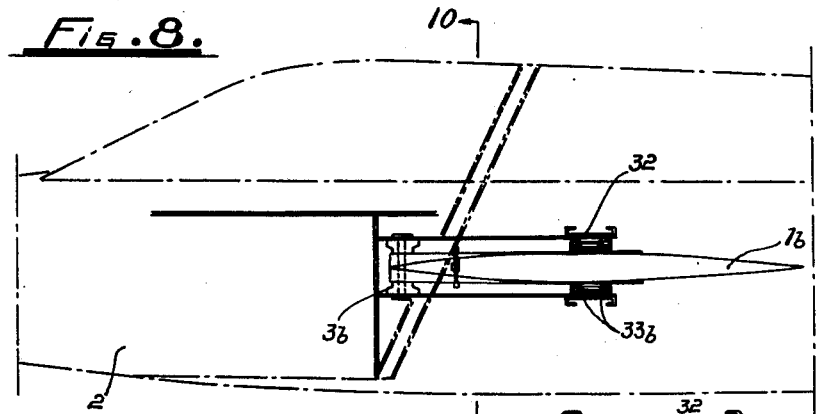
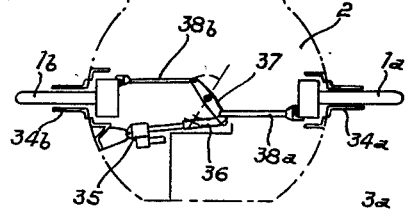
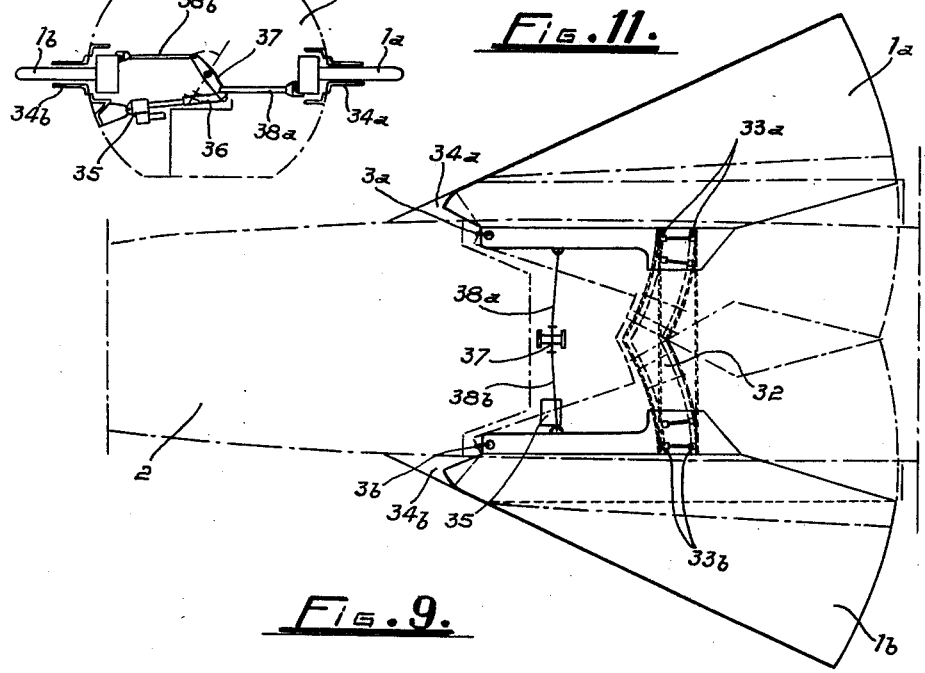

United States Patent Office 2,924,400
Patented Feb. 9, 1960

2,924,400

APPARATUS FOR ENABLING THE MANOEUVRA-
BILITY AND THE STABILITY OF A SUPERSONIC
AIRCRAFT TO BE CONTROLLED

Etienne Germain Ruget, Chatenay-Malabry, France, assignor to Nord Aviation Societe Nationale de Constructions Aeronautiques, Paris, France, a company of France Application May 18, 1954, Serial No. 430,645

Claims priority, application France May 22, 1953

6 Claims. (Cl. 244—46)

It is known that the characteristics of stability and manoeuvrability of an aircraft are subjected to very considerable disturbances when the range of speed extends from the subsonic to the supersonic range.

These disturbances are mainly due to the displacement of the "focus" of the aircraft with respect to its center of gravity. It will be recalled that the lines of action of the lift forces constitute the envelope of a parabola, the "focus" of which is a point about which their moment is constant, this having been pointed out by W. F. Durand in "Aerodynamic Theory" published in 1935 in Berlin.

It happens that, when the speed increases in passing from the subsonic to the supersonic range, this focus moves towards the rear by a distance which depends on the form and the surfaces of the aircraft, but which is always considerable. Parenthetically, it may be noted that the focus is fixed for a given configuration at subsonic velocity at one position, and for supersonic velocity at another position, it moving from the one position to the other position as the aircraft travels through the transonic zone. The result of this is that the movements of control which were sufficient to effect the manoeuvres of the aircraft at subsonic speeds are no longer adequate when the speed passes into the supersonic range, or at least the range of evolution which they can effect then becomes very limited.

The use of such controls would make it necessary to over-dimension them and this would be accompanied by serious drawbacks from the point of view of weight, of the rigidity of the structures and of the power required from the servo-mechanisms which are intended to actuate these controls.

Different solutions have already been proposed in order to overcome these drawbacks, amongst which may be mentioned the displacement in flight of the centre of gravity of the aircraft, or again the variation of the sweep-back or of the surface of the wing system.

All these solutions have the disadvantage that their construction is difficult and is not very compatible with obtaining the minimum weight sought for in the case of aircraft.

The present invention relates to an arrangement by means of which the displacement of the focus, which is detrimental to the action of the control, is compensated during supersonic flight and which, in addition, enables the focus to be displaced with respect to the centre of gravity when any other conditions of use of the aircraft so require. It also enables this said compensation to be carried out automatically or non-automatically in a manner adapted to the specific needs of the aircraft.

This arrangement is characterised by the addition of one or a number of movable auxiliary lifting surfaces symmetrically arranged with respect to the central longitudinal plane of the aircraft, the said surfaces being placed in front of the main fixed lifting surface of the aircraft and being adapted to move outwards from the fuselage of the aircraft in such a manner that the projection on the plane of the wings of the surface placed in the airstream is variable.

The outward movement of the auxiliary lifting surface is initiated by a device which may be automatic or otherwise, in dependence on the speed of the aircraft or on any other parameter.

The dimensions of the said auxiliary surface and its arrangement with respect to the fixed wing or wings, are chosen so as to be able to adjust the relative position of the centre of gravity and the focus of the aircraft, account being taken of the conditions of supersonic flight.

Before proceeding to describe in detail the examples of the suggested embodiments, it is necessary to make quite clear the specific features of the invention and its method of operation.

On an aircraft with fixed wings, the addition of an auxiliary lifting surface will lead to the production of an extra lift. The new resultant of the lifting forces has the properties previously set forth: more particularly, the line of action will envelop a parabola, the "focus" of which is the new "focus" of the aircraft.

Theory and practice show that the new focus does not come into coincidence with the previous one and is located, with respect to the latter, on the same side as the auxiliary surface.

Therefore, since the passage from subsonic flight to supersonic flight results in a recession of the aircraft focus, this recession, according to the invention, will be compensated for by adding an auxiliary lifting surface, ahead of the main wings.

Other features and advantages of the present invention will become apparent from the detailed description thereof which is given below with reference to the attached drawings representing in a diagrammatic manner and simply by way of example, different forms of embodiment and possible applications of the invention.

With reference to the drawings:

Fig. 1 is a plan view showing the method of projection of two triangular movable surfaces from the interior of a fuselage, by pivoting about two axes perpendicular to the plane of the wings.

Fig. 2 is also a plan view showing the method of projection of two movable surfaces having the shape of parallelograms, by lateral movement from the interior of a fairing member arranged inside the air inlet orifice of a reaction unit.

Fig. 3 is a plan view of a supersonic device which comprises, in accordance with a preferred form of embodiment of the invention, two triangular auxiliary surfaces adapted to pivot about two axes perpendicular to the plane of the fixed wing surface.

Figs. 4 and 5 are plan views of the front portion of the device showing the arrangement of the movable surfaces and their control system, in the inoperative position and in the operative position respectively.

Fig. 6 is a plan view of the front portion of a tele-guided device intended to fly at very considerable differences in altitude.

Fig. 7 shows a view in side elevation of a supersonic aircraft in which the outward movement of the movable surfaces is controlled by an automatic pilot device.

Figs. 8 and 9 are detail views showing the method of construction of the movable surfaces and their control, the views given being an inside elevation and a plan view respectively.

Fig. 10 is a view in cross-section following the line 10—10 of Fig. 8.

Fig. 11 is a detail view on a larger scale of the roller-track.

The auxiliary mobile surfaces arranged, according to the invention, ahead of the aircraft fixed wings, will be advantageously either of the type illustrated in Figure 1 or of the type illustrated in Figure 2.

In the first case, the mobile surfaces 1a and 1b will have a triangular shape and will retract into body 2 by pivoting about two axes 3a and 3b at right angles to the plane of the main wings, thus coming to the location shown in dotted line.

In the second case, the mobile surfaces 1a and 1b will have the shape of a parallelogram highly swept back and, to come to the location shown in dotted line, they will retract, by means of a translation in their own plane, into a fairing 4 itself located within the air-inlet 5 of the reactor.

Figures 3, 4 and 5 illustrate the application of the invention to an engine intended for launching with a very high acceleration, bringing it up to a supersonic speed, this speed being thereafter kept approximately constant by means of a cruising speed propulsion unit (not shown).

The first phase of the movement of the device is extremely short and the guiding control has not, in practice, time to become effective. It then suffices that the device should be stable on its trajectory, even when its speed is subsonic, which corresponds to an advanced position of the centre of gravity. (The mobile surfaces 1a and 1b are then in their retracted position.)

In the second phase, the focus of the device moves back towards the rear, which has the effect of increasing its stability to an extent which would be liable to make it uncontrollable having regard to the low power which can be exerted by the controls. This rearward position of the focus may be estimated during the course of preliminary tests (in the wind tunnel, tests in flight, etc.).

The outward displacement of the movable surfaces 1a and 1b gives the focus of the device 2 a position compatible with the requirements of the guiding control and the power of the controls during the second phase of its travel.

Fig. 4 shows the arrangement of the assembly during the acceleration stage, whilst Fig. 5 shows the arrangement of the same assembly during the second stage, after the interlock has been removed on the automatic outward displacement device acting on the movable surfaces 1a and 1b.

The latter are mounted so as to be able to pass from the folded-in position (see Fig. 4) to the outwardly extended position (see Fig. 5) by pivoting about the axes 3a and 3b and a sliding movement of studs 7a and 7b inside slides 8a and 8b under the action of a control spring 9.

During the first stage of the movement, the movable surfaces 1a and 1b are maintained in the folded-in position against the action of the spring 9, by means of an interlocking device 10. The opening of this latter device is automatically controlled at the end of the first stage through the medium of a Machmeter 11 combined with a double Pitot tube 12 which operates it by means of a relay 13 and battery 14 of the device. Locking device 10 conveniently comprises an electrically controlled bolt, such as one withdrawn by a solenoid.

In the case of a device which rapidly reaches a high Mach number under a high acceleration, the Machmeter 11 may be replaced by a mechanical arrangement acting in dependence on the operation of the cruising propulsion unit, or by any other arrangement enabling the interlock device 10 to be automatically freed when the speed reached has become sufficiently high.

In the case of a non-automatic outward displacement of the moving surfaces, the freeing of the interlock may be effected with advantage by means of an order passed through the tele-control system.

Fig. 6 illustrates the application of the invention to a remote controlled or teleguided aircraft 2 intended for flights at widely differing altitudes, and whose remote or tele-control gives on-off orders to the control-surfaces placed within the relative wind. On-off orders are part of that type of electromagnetic guidance in which only a full movement of a control surface is obtained from a command signal, as distinguished from the case in which the control surface is variously moved in response to one of a multiple possible orders or command signals. Since the lock of the control surface is not gradual, turns of differing magnitudes are obtained by transmitting turn orders of differing duration.

If the focus had a fixed position, the response of the aircraft to a given turn order, i.e., for a given control duration, would vary according to the dynamic pressure, hence according to the altitude, which would be a drawback. In order to obviate this drawback, the outward movement of the mobile surfaces 1a and 1b is linked to the dynamic pressure so as to render the distance between the focus and the center of gravity proportional to said pressure, the response to the guiding orders thus remaining substantially constant.

The arrangement of the movable surfaces 1a and 1b remains the same as in the case considered with reference to Figs. 4 and 5. On the other hand, the outward movement of the said surfaces is controlled by an anemometric capsule 15 of thick section and having a shape such that a variation in the pressure difference between the inside and the outside of the capsule causes it to expand or to shrink. Advantage is taken of this variation in the length of capsule 15 to cause the displacement of mobile surfaces 1a and 1b by the fact that said capsule is connected to a source of total pressure 16 and is rigidly coupled to a rod 17 which transmits its movement to the surfaces 1a and 1b through the intermediary of two connecting rods 18a and 18b and two crank arms 20a and 20b, pivoted at 21a and 21b.

The same result could be obtained by an arrangement, not shown, involving replacing the direct action of the capsule 15 by a relay or a number of relays in succession operated by hydraulic or electrical power set in operation by a detecting capsule.

Figs. 7, 8, 9 and 10 show the application of the invention to a supersonic aircraft 2.

Fig. 7 is an inside elevation of an aircraft of this kind in which the outward movement of the movable surfaces 1a and 1b is controlled by an automatic pilot device 22, which receives the indications of the various instruments which measure the parameters affecting the longitudinal stability, such as for example a normal accelerometer 23, a gyrometer 24, a master-horizon 25 constituted by a free gyroscope, a double Pitot tube 26 giving the total and static pressures and a potentiometer 27 showing the displacement of the elevon 28. In this case, the pilot always has the same "feel" of the controls, no matter how much the focus of the aircraft is displaced.

Figs. 8, 9 and 10 show the details of the construction of the movable surfaces 1a and 1b properly so-called.

Fig. 8 shows the movable surface 1b with its pivotal axis 3b fixed to the strengthened structure of the fuselage 2.

A roller-track 32, on which are supported rollers 33b carried by the movable surface 1b, is adapted to take up the stresses due to flexure.

Fig. 10 is a cross-section following the line 10—10 of Fig. 8 and shows the fairings 34a and 34b which ensure the continuity of the surfaces of the fuselage 2 and the surfaces 1a and 1b. The outward movement of the latter is effected by the action of an electric jack 35 through the intermediary of the crank-rod 36 of the pivoted crank arm 37 and of the two crank-rods 38a and 38b.

Fig. 9 shows the same details in plan view which clearly indicates the shape of the roller-track 32, the arrangement of the rollers 33a and 33b and the shape of the fairings 34a and 34b.

In the particular case of an aircraft with a pilot, the outward movement of the movable surfaces may be controlled with advantage by the pilot himself if so required, by means of a manual control arrangement.

I claim:

1. An aircraft having a main lifting surface, said surface having a resultant lift force having a relatively forward position at subsonic velocities and a relatively rearward position at supersonic velocities, means to counteract the rearward shift of the resultant lift force upon attainment of transonic velocity by said aircraft, said means comprising auxiliary lifting surfaces forwardly of said main lifting surface movable from a position within said aircraft to a position exteriorly of said aircraft and in the air stream, and means responsive to aircraft velocity and operatively connected to said auxiliary lifting surfaces for moving said auxiliary lifting surfaces to the position exteriorly of said aircraft upon attainment of transonic velocity by said aircraft.

2. In an aircraft having a main lifting surface, a pair of auxiliary lifting surfaces movably mounted forwardly of said main lifting surface, said auxiliary lifting surfaces being movable from a first position within said aircraft to a second position extended outwardly into the air stream, and means responsive to aircraft velocity and connected to said auxiliary surfaces for moving said auxiliary surfaces into said second position upon the attainment of transonic speed by said aircraft.

3. The apparatus of claim 2, said means comprising means urging said auxiliary lifting surfaces toward said second position, a locking device retaining said auxiliary lifting surfaces in said first position, and control means responsive to the attainment by said aircraft of transonic velocity to release said locking device.

4. The apparatus of claim 2, said means comprising an elastic capsule having a dynamic pressure sensing means operatively connected thereto.

5. An aircraft having a main lifting surface, a pair of auxiliary lifting surfaces forwardly of said main lifting surfaces and mounted for movement from a first position within said aircraft to a second position exteriorly of said aircraft and in the air stream, a dynamic pressure sensing means on said aircraft, an elastic capsule in said aircraft fluid connected to said dynamic pressure sensing means to be expanded upon an increase in dynamic pressure, and means connecting said capsule to said auxiliary lifting surfaces to move said auxiliary lifting surfaces from said first position toward said second position upon an increase in dynamic pressure and consequent expansion of said capsule.

6. The apparatus of claim 5, said connecting means comprising links connected to said capsule and to said auxiliary lifting surfaces.

References Cited in the file of this patent

UNITED STATES PATENTS

| | | |
|---|---|---|
| 1,030,968 | Bourdelles | July 2, 1912 |
| 1,606,117 | Caples | Nov. 9, 1926 |
| 1,862,102 | Stout | June 7, 1932 |
| 2,342,184 | Fawcett | Feb. 22, 1944 |
| 2,376,636 | Thompson | May 22, 1945 |
| 2,512,790 | Cleveland | June 27, 1950 |
| 2,601,962 | Douglas | July 1, 1952 |
| 2,671,620 | Andrews | Mar. 9, 1954 |
| 2,683,574 | Peterson | July 13, 1954 |

FOREIGN PATENTS

| | | |
|---|---|---|
| 650,322 | Great Britain | Feb. 21, 1951 |